US007606750B1

(12) United States Patent
Hoag et al.

(10) Patent No.: US 7,606,750 B1
(45) Date of Patent: Oct. 20, 2009

(54) METHOD AND SYSTEM FOR DISPLAYING A SPENDING COMPARISON REPORT

(75) Inventors: Didrik Hoag, San Carlos, CA (US); John Reed Flora, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 307 days.

(21) Appl. No.: 11/395,647

(22) Filed: Mar. 30, 2006

(51) Int. Cl.
*G06Q 40/00* (2006.01)
*G07B 17/00* (2006.01)

(52) U.S. Cl. .............................. 705/35; 705/30; 705/42
(58) Field of Classification Search ............... 705/1, 705/10, 35, 38, 36 R, 39, 14, 26, 30, 31, 32, 705/33, 34, 42; 235/380
See application file for complete search history.

(56) References Cited

U.S. PATENT DOCUMENTS

| 5,093,787 | A | * | 3/1992 | Simmons | 705/33 |
| 5,358,278 | A | * | 10/1994 | Ellis | 281/31 |
| 5,433,483 | A | * | 7/1995 | Yu | 283/58 |
| 5,737,440 | A | * | 4/1998 | Kunkler | 235/379 |
| 6,195,452 | B1 | * | 2/2001 | Royer | 382/135 |
| 6,968,316 | B1 | * | 11/2005 | Hamilton | 705/36 R |
| 2001/0029475 | A1 | * | 10/2001 | Boicourt et al. | 705/30 |
| 2003/0061358 | A1 | * | 3/2003 | Piazza et al. | 709/227 |
| 2004/0068438 | A1 | * | 4/2004 | Mitchell et al. | 705/14 |
| 2004/0216157 | A1 | * | 10/2004 | Shain et al. | 725/42 |
| 2005/0049911 | A1 | * | 3/2005 | Engelking et al. | 705/11 |
| 2007/0038566 | A1 | * | 2/2007 | Shestakov et al. | 705/44 |

OTHER PUBLICATIONS

Morochove, Richard "First Look: Microsoft Office Small Business Accounting" Nov. 5, 2004.*
Lombardo, Carly "Account Aggregation; Shaping up Portfolios; CPAS are Providing Lients With a Unified View of Their Investments" Aug. 2002, Accounting Technology, 18, 7, 34(5).*
Arora, Harpreet "Adoption of International Accounting Standards: Ten Commandments for the EU Financial Services Sector" Dec. 2003, Journal of International Banking Regulation, V5N2pp. 179-189.*
Anonymous "Successes and Challenges in DHS's Efforts to Creat" Mar. 29, 2005, GAO Reports.*

* cited by examiner

*Primary Examiner*—Kelly Campen
(74) *Attorney, Agent, or Firm*—Osha • Liang LLP

(57) ABSTRACT

A system for displaying a spending comparison report includes a spending data repository, a report module, and a display device. The spending data repository is configured to store a current spending amount associated with a current spending group ID and a current spending date, and a historical spending amount associated with a historical spending group ID and a historical spending date. The report module is configured to obtain a spending data grouping selected from multiple spending data groupings, obtain a current date range for the spending data grouping, generate multiple selectable historical date ranges based on the current date range, obtain a historical date range selected from the multiple selectable historical date ranges, retrieve the current spending amount, retrieve the historical spending amount from the spending data repository, and obtain a spending difference between the current spending amount and the historical spending amount. The display device is configured to display the current spending amount, the spending difference, and the historical spending amount.

9 Claims, 4 Drawing Sheets

METHOD AND SYSTEM FOR DISPLAYING A SPENDING COMPARISON REPORT

BACKGROUND

Present financial management applications provide numerous tools for budgeting, entering, and tracking spending behavior. For example, a user might create a monthly budget for food expenditures, enter food-related spending over a period of time, then run a report to compare actual food-related spending with the pre-defined budget. This method of financial management requires that the user define a budget for each spending category that the user wishes to track. For example, if the user wishes to track food, mortgage, education, tax, clothing, and entertainment expenditures separately, the user must define a separate budget for each of these spending categories. Expenditures not linked to a particular budget are not included in budget reports.

Many users do not wish to create a formal budget for each spending category as described above. For example, a user may wish to track spending habits over time, without assigning a fixed upper bound for a particular category. Further, the user may not have either the time or resources to determine a baseline spending target.

In order to compare current spending with an average of past spending in a particular spending category, a user traditionally obtains a report providing historical spending data for the spending category, then perform manual calculations to obtain the average for comparison with current spending. For example, the user might obtain a report detailing a history of food-related expenditures, manually calculate the average of food-related expenditures for the last six months, then compare the average with the most recent month of food purchases.

Alternatively, irrespective of particular budgets or spending categories, the user may wish to track spending habits relating to a specific payee. For example, the user might wish to compare a current credit card payment with an average of past payments for the same credit card. Present financial management applications allow the user to select a payee (e.g., the credit provider) and view a history of all spending relating to that payee. In order to compare the current credit card payment with an average of past credit card payments, the user must perform a manual calculation as described above in relation to spending categories.

SUMMARY

In general, in one aspect, the invention relates to a method for displaying a spending comparison report. The method comprises selecting a spending data grouping from a plurality of spending data groupings, selecting a current date range and a historical date range for the spending data grouping, retrieving a current spending amount associated with the current date range and the spending data grouping, retrieving a historical spending amount associated with the historical date range and the spending data grouping, and displaying the current spending amount and the historical spending amount.

In general, in one aspect, the invention relates to a system for displaying a spending comparison report. The system comprises a spending data repository configured to store a current spending amount associated with a current spending group ID and a current spending date, and a historical spending amount associated with a historical spending group ID and a historical spending date. The system further comprises a report module configured to obtain as input a spending data grouping selected from a plurality of spending data groupings, obtain as input a current date range and a historical date range for the spending data grouping, retrieve the current spending amount from the spending data repository, wherein the current spending amount is associated with the current date range and the spending data grouping, and retrieve the historical spending amount from the spending data repository, wherein the historical spending amount is associated with the historical date range and the spending data grouping. The system further comprises a display device configured to display the current spending amount and the historical spending amount on the display device.

In general, in one aspect, the invention relates to a graphical user interface displaying a spending comparison report on a display device. The graphical user interface comprises a symbolic spending report comprising a current spending image based on a current spending amount retrieved from a data repository and associated with a user-selected current date range and a user-selected spending data grouping, and a historical spending image based on a historical spending amount retrieved from the data repository and associated with a user-selected historical date range and the user-selected spending data grouping. The graphical user interface further comprises a tabular spending report comprising a tabular representation of the current spending amount, and a tabular representation of the historical spending amount.

In general, in one aspect, the invention relates to a data structure. The data structure comprises a first element comprising a spending amount, a second element comprising a spending group ID for the spending amount, and a third element comprising a spending date for the spending amount, wherein the spending amount comprises one selected from a group consisting of a current spending date based on a user-selected current date range and a historical spending date based on a user-selected historical date range, wherein a first instance of the data structure has a current spending date, wherein a second instance of the data structure has a historical spending date, wherein the first instance and the second instance have matching second elements, and wherein the first elements of the first instance and the second instance are displayed on a display device.

Other aspects of the invention will be apparent from the following description and the appended claims.

DETAILED DESCRIPTION

Figure 1:
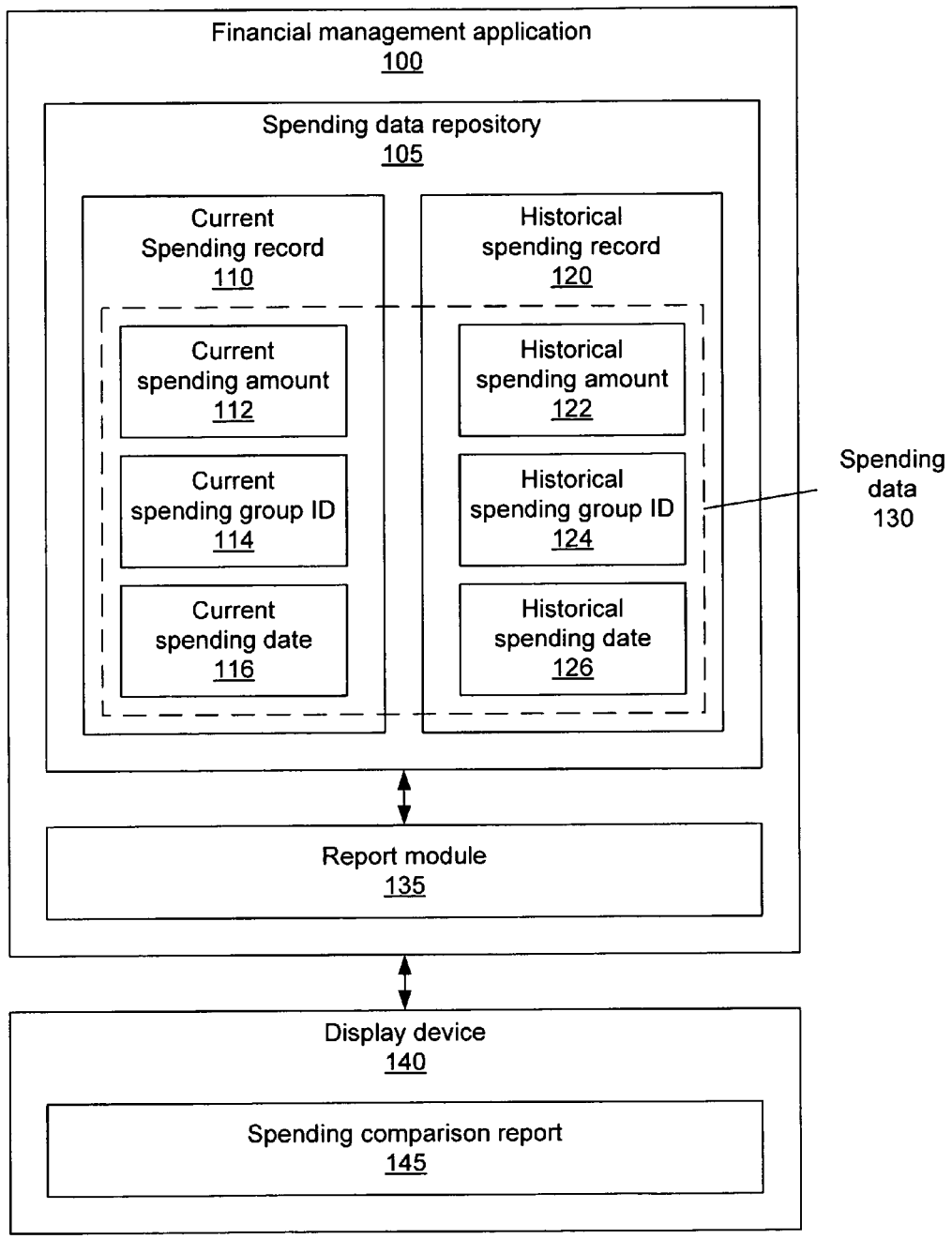
FIG. 1 shows a financial management application and a display device in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for displaying a spending comparison report. The invention involves retrieving and displaying a current spending amount associated with a current date range and a spending data grouping. The current spending amount and historical spending amount are displayed on a display device. In one embodiment of the invention, the current spending amount and the historical spending amount are associated with data from a financial management application. The spending data grouping is often grouped by a payee or spending category within the financial management application.

FIG. 1 shows a system for displaying a spending comparison report in accordance with one embodiment of the invention. A report module (135) is configured to retrieve spending data (130) from a spending data repository (105). In one or more embodiments, the report module (135) and spending data repository (105) are components of a financial management application (100). Those skilled in the art will appreciate that the report module (135) and spending data repository (105) may alternatively be components of a resource allocation application, a project planning application, or any other type of application wherein a spending comparison report may provide utility.

In one or more embodiments, the spending data repository (105) comprises spending data (130), which contains one or more spending records. One or more of the spending records includes a spending amount, a spending group ID, and a spending date. One or more of the spending records may be identifiable as: (1) a current spending record (110), which includes a current spending amount (112), a current spending group ID (114), and a current spending date (116); or (2) a historical spending record (120), which includes a historical spending amount (122), a historical spending group ID (124), and a historical spending date (126). In one or more embodiments of the invention, identifying a spending record as a current spending record (110) or a historical spending record (120) may be dynamically determined based on user input, as discussed in further detail below.

In one or more embodiments, the current spending amount (112) and historical spending amount (122) may be stored as a decimal value, a hexadecimal value, a binary value, a foreign key to a value stored in a database table (not shown), or any other type of value suitable for storing a spending amount. Those skilled in the art will appreciate that the current spending amount (112) may include a positive, negative, or zero value, depending on the spending event with which the spending amount is associated.

In one or more embodiments, the current spending group ID (114) and historical spending group ID (124) may be stored as a number, text, a foreign key to a value stored in a database table (not shown), or any other type of value suitable for storing a spending group ID. In one or more embodiments, the current spending date (116) and historical spending date (126) may be stored as a number, text, a foreign key to a value stored in a database table, or any other type of value suitable for storing a spending date. Those skilled in the art will appreciate that the current spending date (112) or historical spending date (126) may include a past date, a present date, or a future date, representing a past, present, or future spending event, respectively. Further, those skilled in the art will appreciate that many ways exist to store elements of a spending record, and that all elements of a spending record may not be stored in the same manner. Additionally, in one or more embodiments of the invention, corresponding elements in separate spending records may not be stored in the same manner.

In one or more embodiments, the application (e.g., the financial management application (110)) may be configured to communicate with a display device (140) to display a spending comparison report (145). In one or more embodiments, the display device (140) may be a monitor, a printer, a television, a screen on a portable device, or any other type of display device.

Figure 2:
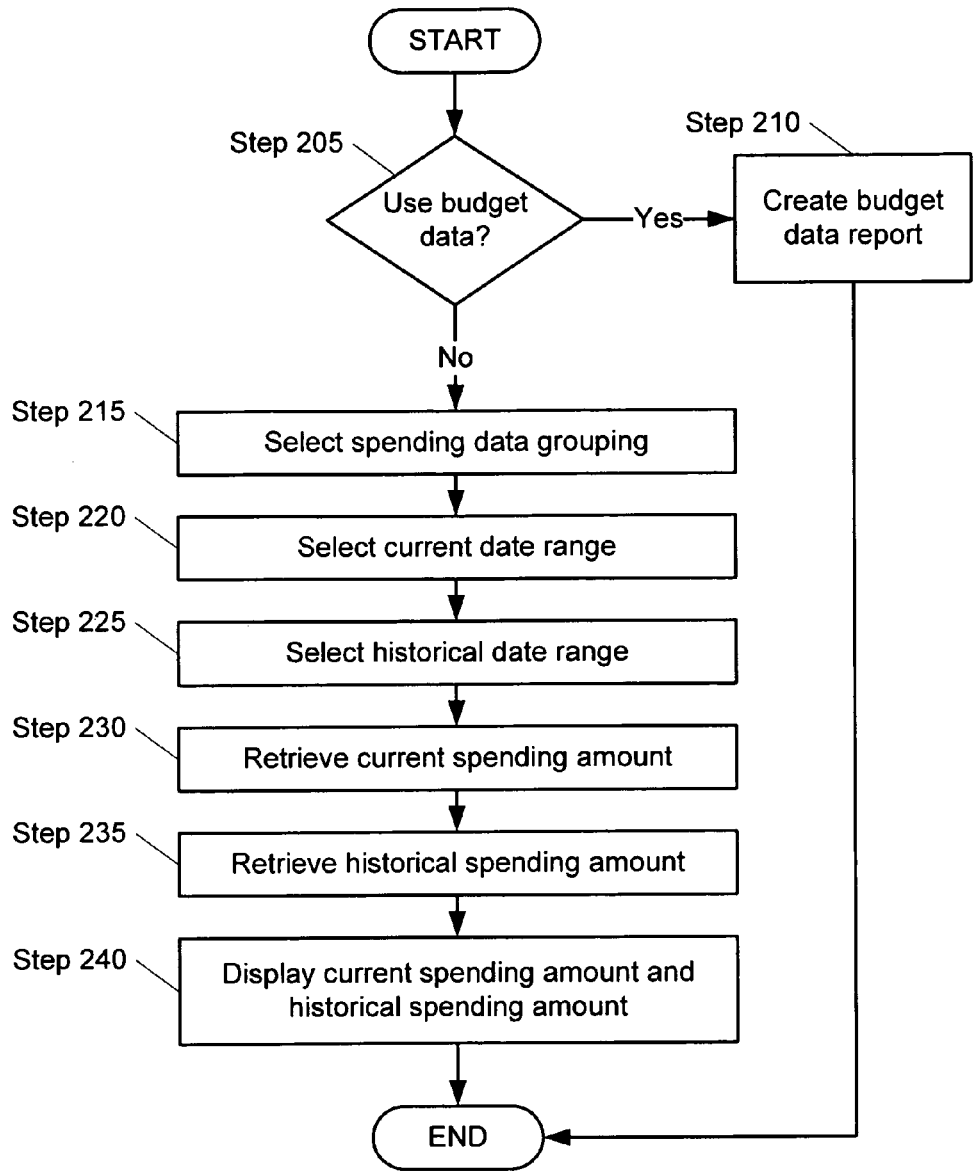
FIG. 2 shows a method for displaying a spending comparison report in accordance with one embodiment of the invention.

FIG. 2 shows a method for displaying a spending comparison report in accordance with one embodiment of the invention. In one or more embodiments of the invention, in Step 205, a user decides whether to generate a report based on budget data. If the user chooses to generate a report based on budget data, a budget data report is created in Step 210. If the user chooses not to generate a report based on budget data, the method proceeds to Step 215. In one or more embodiments of the invention, if budget data are not available, the method may begin directly at Step 215. Further, in one or more embodiments of the invention, the determination whether to use budget data may be performed without user input, or may be skipped entirely.

In one or more embodiments of the invention, in Step 215, the user selects a spending data grouping. In one or more embodiments of the invention, the spending data grouping may be grouped by a payee, a category, or any other type of grouping. For example, the user may select a spending data grouping representing all spending associated with a particular department store, all food-related spending, or any other spending grouping. In one or more embodiments of the invention, selecting a spending data grouping may include selecting a specific report heading, selecting a grouping from a dropdown menu, checking an input box next to a grouping title, or any other type of selection.

In Step 220, the user selects a current date range. In one or more embodiments of the invention, the current date range is selected using the current date range input, as discussed in more detail below. Those skilled in the art will appreciate that there are many different ways to select the current date range. In one or more embodiments of the invention, the current date range may be a fixed date range, a calculated date range, a date range selected without user input, or any other type of date range.

In Step 225, the user selects a historical date range. In one or more embodiments of the invention, the historical date range is selected using the historical date range input, as discussed in more detail below. Those skilled in the art will appreciate that there are many different ways to select the historical date range. In one or more embodiments of the invention, the historical date range may be a fixed date range, a calculated date range, a date range selected without user input, or any other type of date range. Further, in one or more embodiments of the invention, the historical date range may be selected from a plurality of historical date ranges based on the current date range. For example, if the user selects a current date range of "current month," the plurality of historical date ranges based on the current date range may include "last month," "last 3 months," "last 6 months," "last 12 months," or any historical date range based on the current date range. Those skilled in the art will appreciate that there are many ways to base a plurality of historical date ranges on the current date range.

Those skilled in the art will appreciate that selecting the spending data grouping, current date range, and historical date range may be performed in any order or concurrently, depending on the implementation of the invention or any other factor.

In Step 230, the report module retrieves the current spending amount from the spending data repository. In one or more embodiments of the invention, retrieving the current spending amount is based on the current spending group ID being associated with the spending data grouping selected in Step 215 and the current spending date being within the current date range selected in Step 220. Those skilled in the art will appreciate that a current spending amount, thus retrieved, represents a spending event belonging to the selected spending data grouping and occurring within the current date range. In one or more embodiments of the invention, a plurality of current spending amounts may be retrieved; accordingly, the current spending amount used in subsequent steps may be a total of the plurality of current spending amounts, an average of the plurality of current spending amounts, or any other combination thereof.

In Step 235, the report module retrieves the historical spending amount from the spending data repository. In one or more embodiments of the invention, retrieving the historical spending amount is based on the historical spending group ID being associated with the spending data grouping selected in Step 215 and the historical spending date being within the historical date range selected in Step 225. Those skilled in the art will appreciate that a historical spending amount, thus retrieved, represents a spending event belonging to the selected spending data grouping and occurring within the historical date range. In one or more embodiments of the invention, a plurality of historical spending amounts may be retrieved; accordingly, the historical spending amount used in subsequent steps may be a total of the plurality of historical spending amounts, an average of the plurality of historical spending amounts, or any other combination thereof.

In Step 240, the application (e.g. the financial management application) displays the current spending amount and historical spending amount on a display device. In one or more embodiments, the application may display the current spending amount and historical spending amount on the display device via a graphical library call, a native system call, a printer interface call, a network communication, or any other type of display method. Those skilled in the art will appreciate that there are many ways to display information on a display device, implemented in hardware and/or software, depending on the implementation of the invention or any other factor.

Figure 3:
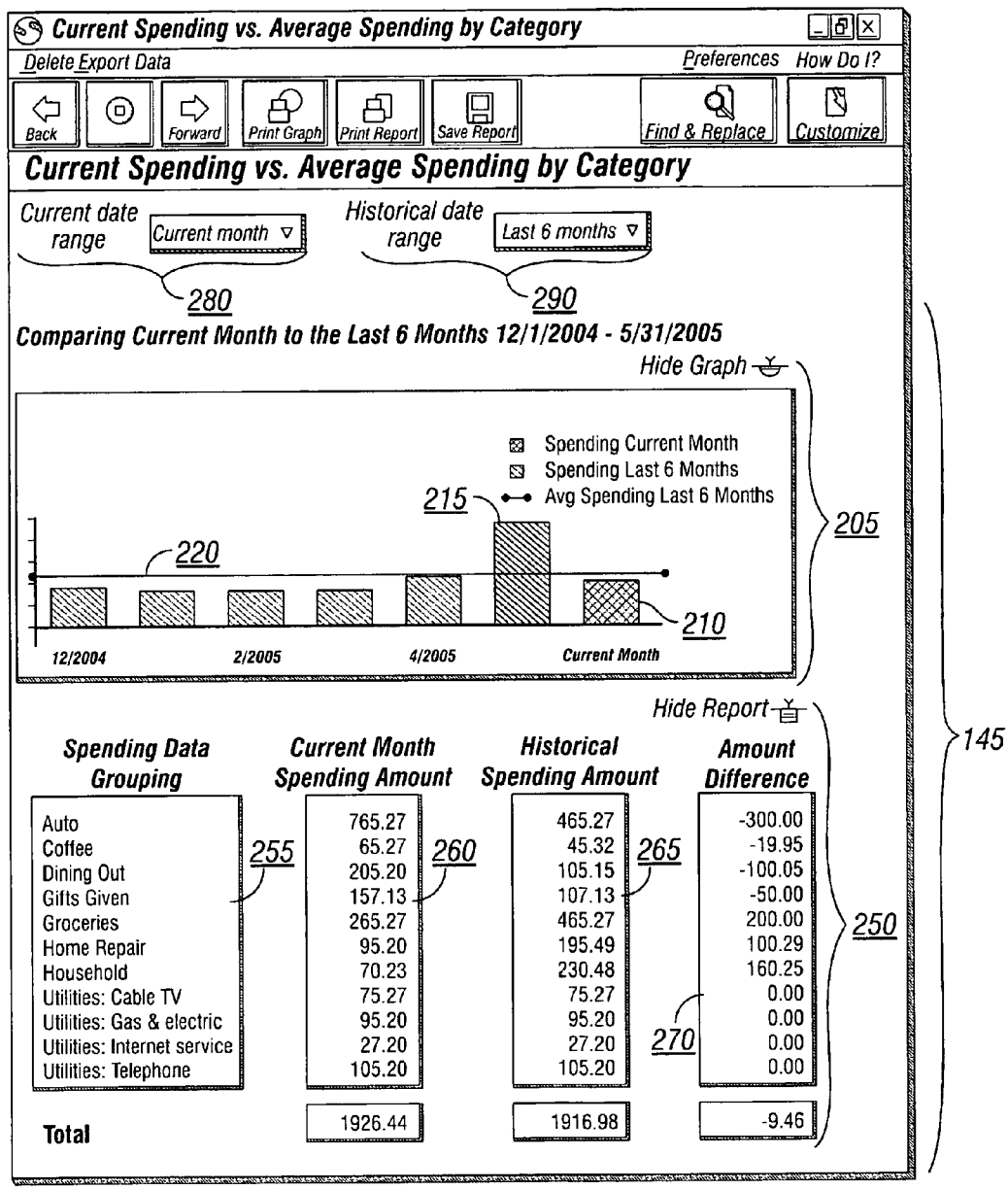
FIG. 3 shows a graphical user interface in accordance with one embodiment of the invention.

In one or more embodiments of the invention, the current spending amount and historical spending amount may be displayed on the display device in a spending comparison report (145). FIG. 3 shows a spending comparison report (145) in accordance with one embodiment of the invention. In one or more embodiments, the spending comparison report (145) may be displayed in a graphical user interface (200) on the display device. In one or more embodiments, the graphical user interface (200) may be a Microsoft® Windows-based user interface, a graphical user interface on a portable device, or any other type of graphical user interface. Those skilled in the art will appreciate that the invention is not limited to any particular type of graphical user interface.

In one or more embodiments, the graphical user interface (200) also includes a current date range input (280) and a historical date range input (290), enabling a user to select the current date range and historical date range, as discussed above. Those skilled in the art will appreciate that the current date range input (280) or historical date range input (290) may be a dropdown, text box, radio button, or any other type of input. Those skilled in the art will also appreciate that the current date range input (280) and historical date range input (290) may not be the same type of input. In one or more embodiments, the graphical user interface may further include a subtotal input (not shown) for organizing the spending comparison report (145), or any other type of input for arranging, modifying, or otherwise affecting the spending comparison report (145).

In one or more embodiments, the spending comparison report (145) includes a symbolic spending report (205) and a tabular spending report (250). Those skilled in the art will appreciate that the spending comparison report (145) may alternatively include only one of the symbolic spending report (205) and the tabular spending report (250), and that the spending comparison report (145) may additionally include any other type of report not specifically discussed herein. In one or more embodiments, the spending comparison report (145) may further include an input for hiding the symbolic spending report (205), tabular spending report (250), or any other element of the spending comparison report (145).

In one or more embodiments, the symbolic spending report (205) includes a current spending image (210) associated with the current spending amount and a historical spending image (215) associated with the historical spending amount. In one or more embodiments, the symbolic spending report may also include a spending comparison image (220) for relating the current spending image and the historical spending image. In one or more embodiments, the current spending image (210), historical spending image (215), and spending comparison image (220) may be a bar graph, a linear graph, a pie chart, a 3-dimensional image, or any other type of image. Those skilled in the art will appreciate that the current spending image (210), historical spending image (215), and spending comparison image (220) may not be the same type of image. Further, those skilled in the art will appreciate that many other types of comparison or manipulation of the current spending amount and historical spending amount may additionally be represented in the symbolic spending report (205).

In one or more embodiments, the tabular spending report (250) includes a tabular representation of a current spending amount (260) and a tabular representation of a historical spending amount (265). In one or more embodiments, the tabular spending report (250) may also include a tabular representation of a spending data grouping (255). In one or more embodiments, the tabular spending report may include a tabular representation of a difference (270) between the current spending amount and the historical spending amount, a tabular representation of a historical spending average associated with the historical date range input (290), or any other type of comparison amount. Those skilled in the art will appreciate that many different types of comparison or manipulation of the current spending amount and historical spending amount may additionally be represented in the tabular spending report (250).

Figure 4:
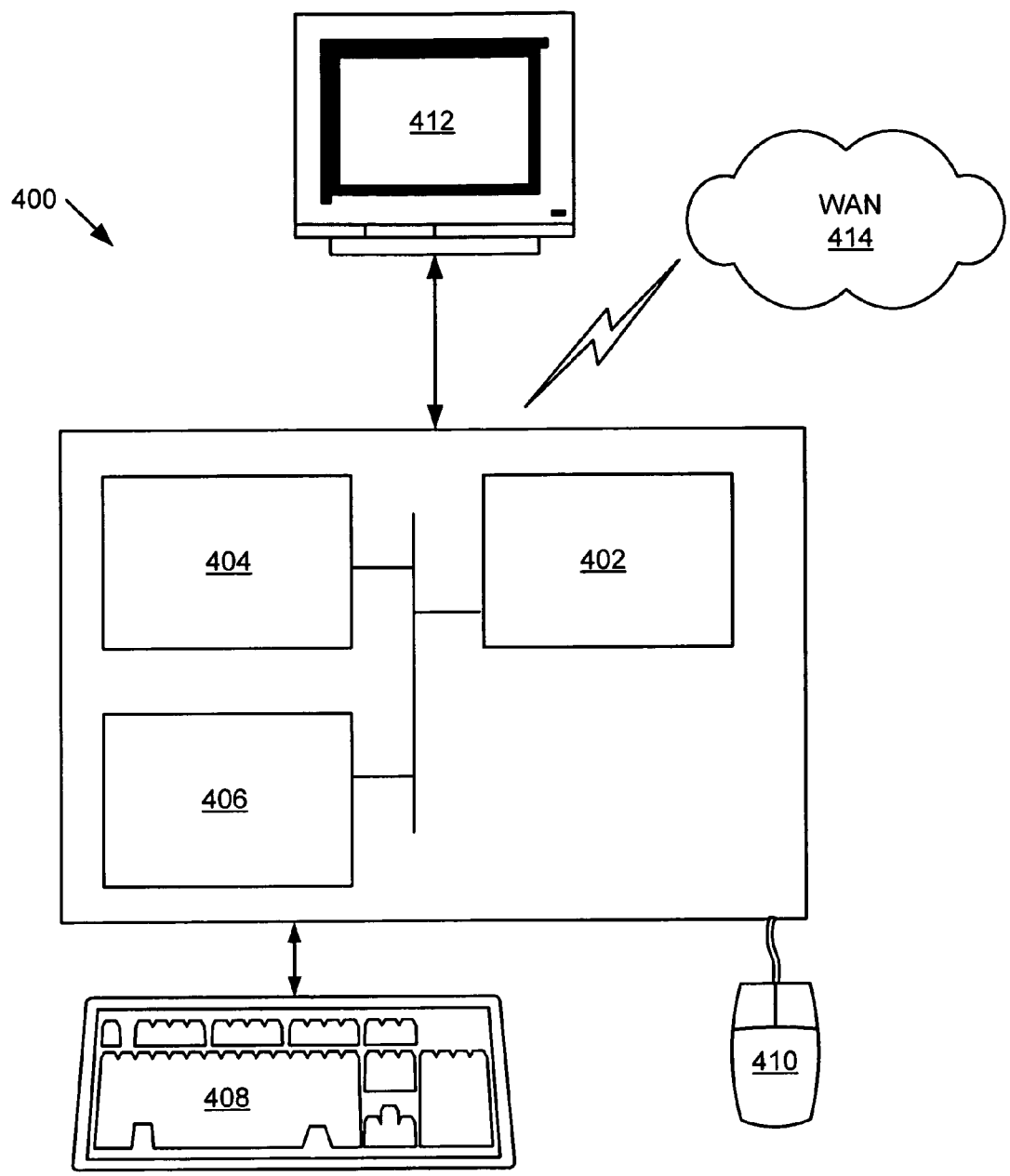
FIG. 4 shows a computer system in accordance with one embodiment of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (414)

via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., spending data repository, report module, display device, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system for displaying a spending comparison report, comprising:
   a spending data repository configured to store:
      a current spending amount associated with a current spending group ID and a current spending date, and
      a historical spending amount associated with a historical spending group ID and a historical spending date;
   a report module configured to:
      obtain as input a spending data grouping selected from a plurality of spending data groupings,
      obtain as input a current date range for the spending data grouping,
      generate a plurality of selectable historical date ranges based on the current date range,
      obtain as input a historical date range selected from the plurality of selectable historical date ranges,
      retrieve the current spending amount from the spending data repository in response to obtaining the current date range, wherein the current spending date falls within the current date range and the current spending group ID is associated with the spending data grouping,
      retrieve the historical spending amount from the spending data repository in response to obtaining the historical date range, wherein the historical spending date falls within the historical date range and the historical spending group ID is associated with the spending data grouping;
      obtain a historical spending average associated with the historical date range; and
      calculate a first spending difference between the current spending amount and the historical spending amount and a second spending difference between the current spending amount and the historical spending average, wherein the current spending amount exists prior to the spending difference; and
   a display device configured to display the current spending amount, the first spending difference, the historical spending amount, the second spending difference and the historical spending average.

2. The system of claim 1 further comprising:
   a financial management application comprising the spending data repository and the report module.

3. The system of claim 2 wherein the financial management application manages at least one selected from a group consisting of small business finances, personal finances, and consumer finances.

4. The system of claim 1 wherein the spending data grouping is grouped by a payee.

5. The system of claim 1 wherein the spending data grouping is grouped by a spending category.

6. The system of claim 1 wherein the report module is further configured to:
   adjust the historical spending amount based on an adjustment factor associated with a changed condition.

7. The system of claim 1, wherein the current date range comprises a month, and wherein the plurality of selectable historical date ranges comprises a six month period prior to the month, a three month period prior to the month, and a two month period prior to the month.

8. The system of claim 1, wherein the current date range comprises a month, wherein the historical date range comprises a three month period prior to the month, and wherein the historical spending average is calculated by summing spending over the three month period to generate a sum and dividing the sum by three.

9. The system of claim 1, wherein the current date range comprises a month, wherein the historical date range comprises a six month period prior to the month, and wherein the historical spending average is calculated by summing spending over the six month period to generate a sum and dividing the sum by six.

* * * * *